(12) United States Patent
Zhu et al.

(10) Patent No.: US 9,719,802 B2
(45) Date of Patent: Aug. 1, 2017

(54) TRANSMITTER AND MONITORING SYSTEM USING THE SAME

(71) Applicant: Delta Electronics (Shanghai) CO., LTD, Shanghai (CN)

(72) Inventors: Ziyu Zhu, Shanghai (CN); Dazhong Zhai, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 187 days.

(21) Appl. No.: 14/669,912

(22) Filed: Mar. 26, 2015

(65) Prior Publication Data

US 2015/0318943 A1 Nov. 5, 2015

(30) Foreign Application Priority Data

Apr. 30, 2014 (CN) .......................... 2014 1 0183041

(51) Int. Cl.
*H04L 5/04* (2006.01)
*G01D 3/02* (2006.01)
(Continued)

(52) U.S. Cl.
CPC .............. *G01D 3/02* (2013.01); *G01D 3/028* (2013.01); *G01D 21/00* (2013.01); *H04J 3/14* (2013.01);
(Continued)

(58) Field of Classification Search
CPC .......... G01D 3/02; G01D 3/028; G01D 21/00; H04L 5/04; H04L 67/12; H04J 3/14; H04J 7/00
See application file for complete search history.

(56) References Cited

U.S. PATENT DOCUMENTS 4,217,645 A * 8/1980 Barry ................. G01R 31/3648
320/116
4,340,886 A * 7/1982 Boldt .................... F16C 17/243
340/502
(Continued)

FOREIGN PATENT DOCUMENTS

CN 2106365 U 6/1992
CN 201748983 U 2/2011
(Continued)

OTHER PUBLICATIONS

1st OA issued on May 2, 2017 by the CN Office.

*Primary Examiner* — Kenneth Lam
(74) *Attorney, Agent, or Firm* — Yunling Ren

(57) ABSTRACT

The present disclosure discloses a transmitter and a monitoring system using this transmitter, the transmitter includes: a multi-to-one multiplexing switch configured to receive a plurality of sensor signals of a plurality of channels through a plurality of input terminals, select one sensor signal from the plurality of sensor signals, and output the selected sensor signal through a output terminal; a first variable gain amplifier configured to receive the selected sensor signal, amplify the selected sensor signal with a gain within a first gain range, and output the amplified sensor signal; a control parameter input terminal configured to receive an input control parameter from outside of the transmitter; and an operating and switching selector configured to perform operations according to the input control parameter, so as to control the multi-to-one multiplexing switch to select the one sensor signal and control the gain of the first variable gain amplifier.

13 Claims, 13 Drawing Sheets

(51) Int. Cl.
*H04J 7/00* (2006.01)
*H04L 29/08* (2006.01)
*H04J 3/14* (2006.01)
*G01D 3/028* (2006.01)
*G01D 21/00* (2006.01)

(52) U.S. Cl.
CPC ............... *H04J 7/00* (2013.01); *H04L 5/04* (2013.01); *H04L 67/12* (2013.01)

(56) References Cited

U.S. PATENT DOCUMENTS

| | | | | |
|---|---|---|---|---|
| 4,875,042 A * | 10/1989 | Oku | ................ | G01K 1/026 340/870.11 |
| 5,095,453 A * | 3/1992 | Pierson | ................ | G01K 1/026 374/E1.005 |
| 5,437,178 A * | 8/1995 | Esin | ................ | G01F 23/296 367/7 |
| 5,852,793 A * | 12/1998 | Board | ................ | G01H 1/003 702/183 |
| 6,864,802 B2 * | 3/2005 | Smith | ................ | G01D 21/00 257/678 |
| 2006/0224350 A1 * | 10/2006 | Tanizawa | ................ | G01D 3/0365 702/130 |
| 2006/0264775 A1 * | 11/2006 | Mills | ................ | A61B 5/0537 600/547 |
| 2008/0224845 A1 * | 9/2008 | Bires | ................ | G01K 1/024 340/501 |
| 2009/0273496 A1 * | 11/2009 | Renner | ................ | H03M 1/0827 341/119 |
| 2012/0212319 A1 * | 8/2012 | Ling | ................ | G06F 1/3203 340/3.1 |
| 2013/0300878 A1 * | 11/2013 | Chiu | ................ | H04N 17/04 348/189 |

FOREIGN PATENT DOCUMENTS

| | | |
|---|---|---|
| CN | 202284208 U | 6/2012 |
| CN | 202331914 U | 7/2012 |

* cited by examiner

TRANSMITTER AND MONITORING SYSTEM USING THE SAME

CROSS REFERENCE TO RELATED APPLICATION

This application is based upon and claims the benefit of priority from the prior Chinese Patent Application No. 201410183041.9 filed on Apr. 30, 2014, entitled "TRANSMITTER AND MONITORING SYSTEM USING THE SAME", before Chinese State Intellectual Property Office, under 35 U.S.C. §119. The content of the above prior Chinese Patent Application is incorporated herein by reference in its entirety.

TECHNICAL FIELD

The present disclosure relates to a transmitter and a monitoring system using this transmitter.

BACKGROUND

With the popularity and industrialization of technology of Internet of things, the application amount of sensors increases greatly. Generally, analog signal of the sensor may be further processed only after being matched and transmitted by a transmitter, thus, the quantity demand and functional requirement for transmitters also increase.

FIG. 1 is a schematic diagram illustrating a typical topology of sensors and transmitters in the prior art, and connection relationships among respective components contained in the topology are shown in FIG. 1. As shown in FIG. 1, for different kinds of sensors S1, S2, . . . and Sn, transmitters T1, T2, . . . and Tn in the prior art represented by dashed boxes need to perform signal amplification by different amplifiers A1, A2, . . . and An which are provided respectively and are not versatile, perform analog/digital conversion by independent analog/digital (A/D) converters C1, C2, . . . and Cn respectively, and perform digital signal processing by separate digital interface circuits I1, I2, . . . and In. If it is intended to use a single line for transferring output signals, it is further required to perform multiplexing by an n-to-1 channel interface circuit M, such as a programmable logic controller (PLC).

In the prior art, since there are various kinds of sensors, indexes of the sensors are divergent, and generally one sensor can only use a particular transmitter, that is, one sensor matches with one transmitter, the transmitters can not be shared and can not be used versatilely, which may result in the following problems:

1. The cost for constructing a monitoring system is high. In a monitoring system, the cost of transmitters usually far exceeds the cost of sensors. Thereby, with the increase in the number of the sensors, the cost grows exponentially.

2. The production cost of the transmitter is high. The transmitters for sensors of different signals, even for a single kind of sensors of the same kind of signal must be used dedicatedly. Thus, not only the user cost increases, but also the producer cost increases. Since the types of the transmitters to be produced are too many, the quantity of each kind of sensors would not be large. Thus, in order to apportion the cost, the price of a single transmitter would be hard to be reduced, and mass production would be hard to be conducted.

3. Electricity waste exists and the life of the system is short. The number of channels processed by the transmitters is low, the transmitters can not be multiplexed, and even if no data is required, each transmitter must still be in a working condition, which not only causes a waste of electricity, but also leads to a short life of the system. In general, one monitoring system is equipped with a plurality of sensors in different kinds, thus, in conditions of slowly data collecting, such as in normal systems where collection intervals are more than ten minute, or even one or two hours or one day, the phenomena of electricity waste and short system life is especially serious.

SUMMARY

The present disclosure is made in consideration of at least a part of the above problems.

One purpose of the present disclosure is to provide a transmitter, including: a multi-to-one multiplexing switch configured to receive a plurality of sensor signals of a plurality of channels through a plurality of input terminals, select one sensor signal from the plurality of sensor signals, and output the selected sensor signal through a output terminal; a first variable gain amplifier configured to receive the selected sensor signal, amplify the selected sensor signal with a gain within a first gain range, and output the amplified sensor signal; a control parameter input terminal configured to receive an input control parameter from outside of the transmitter; and an operating and switching selector configured to perform operations according to the input control parameter, so as to control the multi-to-one multiplexing switch to select the one sensor signal and control the gain of the first variable gain amplifier.

Another purpose of the present disclosure is to provide a monitoring system, including: a plurality of sensors configured to generate a plurality of sensor signals of a plurality of channels; a transmitter configured to comprise: a multi-to-one multiplexing switch configured to receive the plurality of sensor signals of the plurality of channels through a plurality of input terminals, select one sensor signal from the plurality of sensor signals, and output the selected sensor signal through a output terminal; a first variable gain amplifier configured to receive the selected sensor signal, amplify the selected sensor signal with a gain within a first gain range, and output the amplified sensor signal; a control parameter input terminal configured to receive an input control parameter from outside of the transmitter; and an operating and switching selector configured to perform operations according to the input control parameter, so as to control the multi-to-one multiplexing switch to select the one sensor signal and control the gain of the first variable gain amplifier; an analog/digital converter configured to receive the amplified sensor signals output from the transmitter, and convert the amplified sensor signals into digital sensor signals; an interface circuit configured to receive the digital sensor signals, and encode and capsulate the digital sensor signals into a digital output; and a central control unit configured to send the input control parameter to the transmitter, receive the digital output, and decapsulate and decode the digital output, so as to reproduce and display the plurality of sensor signals.

The transmitter and the monitoring system using the transmitter in the present disclosure may set types and required gains of accessed signals of respective channels according to signal features of various sensors, and may achieve functions of multiplexing, sleeping and waking up.

The transmitter and the monitoring system using the transmitter in the present disclosure may receive various types of sensor input signals, and may select channels arbitrarily and dynamically. The signal of each channel may have independent configuration, i.e., whether to use a primary amplifier, and how to determine a primary amplification factor and a secondary amplification factor.

The transmitter and the monitoring system using the transmitter in the present disclosure control the amplification and modulation of the sensor signals by using hardware such as a singlechip or a processor, and embedded software. The amplification factors of the two stages for the input signal are varied according to the programs and configuration files, and a dynamical variation may be achieved.

The transmitter and the monitoring system using the transmitter in the present disclosure control the switching of the multi-channel switch by using the embedded software, so as to achieve the polling function that a plurality of signals share the two stages of amplifiers.

The transmitter and the monitoring system using the transmitter in the present disclosure achieve sleeping function by using the embedded software, so as to make the system enter sleep mode during a non-sampling period, and awake the system to sample signals during a predefined sampling period.

The transmitter and the monitoring system using the transmitter in the present disclosure adopt a digital-analog mixing circuit, are integrated with the operating and switching selector, and may be highly integrated into a small-size singlechip, even a wafer, without a specific power supply requirement.

The transmitter and the monitoring system using the transmitter in the present disclosure may pre-amplify the sensor signals, may configure and program respective ports of the transmitter and rules, may receive outside synchronizing signals to switch channels and output current channel numbers for outside processing, may substitute a majority of transmitters where no high-speed continuous sampling is needed, and may substitute a plurality types of sensor transmitters simultaneously by only updating the embedded software.

The transmitter and the monitoring system using the transmitter in the present disclosure have digital control parameter outputs, can be extended, and can support more extended characters. For example, for some specific sensors needing specific temperature compensation, a multi-channel independent temperature compensation module may be added additionally, which is controlled by the operating and switching selector. For another example, the transmitter may achieve a cascading control by joining on an external circuit, which greatly increases the availability. In addition, for instance, a PLC may be used to connect the operating and switching selector for control.

By using the transmitter and the monitoring system using the transmitter in the present disclosure, a single transmitter may support more than ten channels of sensor signals, or even more than a hundred channels of sensor signals, and may be designed to be cascaded and extendable, which may greatly reduce the cost of purchase and usage.

The transmitter and the monitoring system using the transmitter in the present disclosure may be applied in more than 80% of non-real time high-speed sampling circumstances, and may reduce the cost of a single-channel transmitter from thousands of yuan to hundreds of yuan, tens of yuan or even lower, thereby to greatly reduce the cost and promote large scale applications of sensors.

The transmitter and the monitoring system using the transmitter in the present disclosure may reduce 50% or even more of the fee for deploying and installing on site.

By using the transmitter and the monitoring system using the transmitter in the present disclosure, the modularization and standardization efficiency of the production may be increased to a double or more.

The transmitter and the monitoring system using the transmitter in the present disclosure may reduce energy consumption. Taking one-channel sensor transmitter and the sampling frequency being once an hour as an example, there are totaling N channels. When using traditional circuits, a transmitter needs to be supplied with power continuously, on the assumption that the total power consumption of one-channel A/D converter and interface circuit is 100 units. After the transmitter of the present disclosure is used, the total power consumption of one-channel A/D and interface circuit may be reduced to close to 100/N. That is, the more the used channels are, the more obvious the energy saving is.

The transmitter and the monitoring system using the transmitter in the present disclosure do not need a hardware switch, have a long lifetime, a simple circuit and a high reliability, and are suitable for batch production.

Since adopting embedded software controls, the transmitter and the monitoring system using the transmitter in the present disclosure have an extraordinary flexibility and extendability, have various operation modes, and have independent configuration and characteristic for each channel for judgment and usage of the operating and switching selector, thus become a true versatile and highly centralized multiplexing transmitter. For example, for a water quality remote monitoring system, typically, many kinds of sensors and transmitters, as well as a plurality of channels of A/D and interface circuits are needed. For instance, with respect to potential of hydrogen PH value, dissolved oxygen, temperature, pressure, turbidity, etc., there are generally more than 10 channels of sensors and transmitters. However, if the transmitter and the monitoring system using the transmitter in the present disclosure are used, after the software is set, the plurality of sensors may share the one-channel transmitter, one-channel A/D converting and interface circuit.

By using the transmitter and the monitoring system using the transmitter in the present disclosure, the transmitter may be programmed, and signal smart matching, converting and transmission may be performed by using the operating and switching selector to control the amplification factors of the primary or secondary amplifiers via software, thereby the maximum signal to noise ratio and consistent output characteristic of the signal may be ensured, and universality may be achieved. A plurality of types of sensors may time division multiplex the two stages of amplifiers, the A/D converting and interface circuit through the multi-channel switch, and individually have independent amplifying factors and switching, without influencing each other.

BRIEF DESCRIPTION OF THE DRAWINGS

The above and other purposes, features and other advantages of the present disclosure will become more apparent and understandable from the following detailed depiction in combination with the accompanying drawings.

DETAILED DESCRIPTION

In order to solve at least a part of the above problems existing in the prior art, the present disclosure proposes a transmitter and a monitoring system using this transmitter. The transmitter and the monitoring system using this transmitter proposed in the present disclosure are especially applicable to a low-frequency continuous sampling sensor.

Hereinafter, the present disclosure will be described in combination with FIGS. 2-13, wherein the same reference signs indicate the same or similar devices or signals, solid lines and arrows indicate transmission directions of signals or data and coupling relations among relevant components, dotted lines and arrows indicate control relations, and ellipsis indicate omitting a plurality of similar structures or components.

Figure 1:
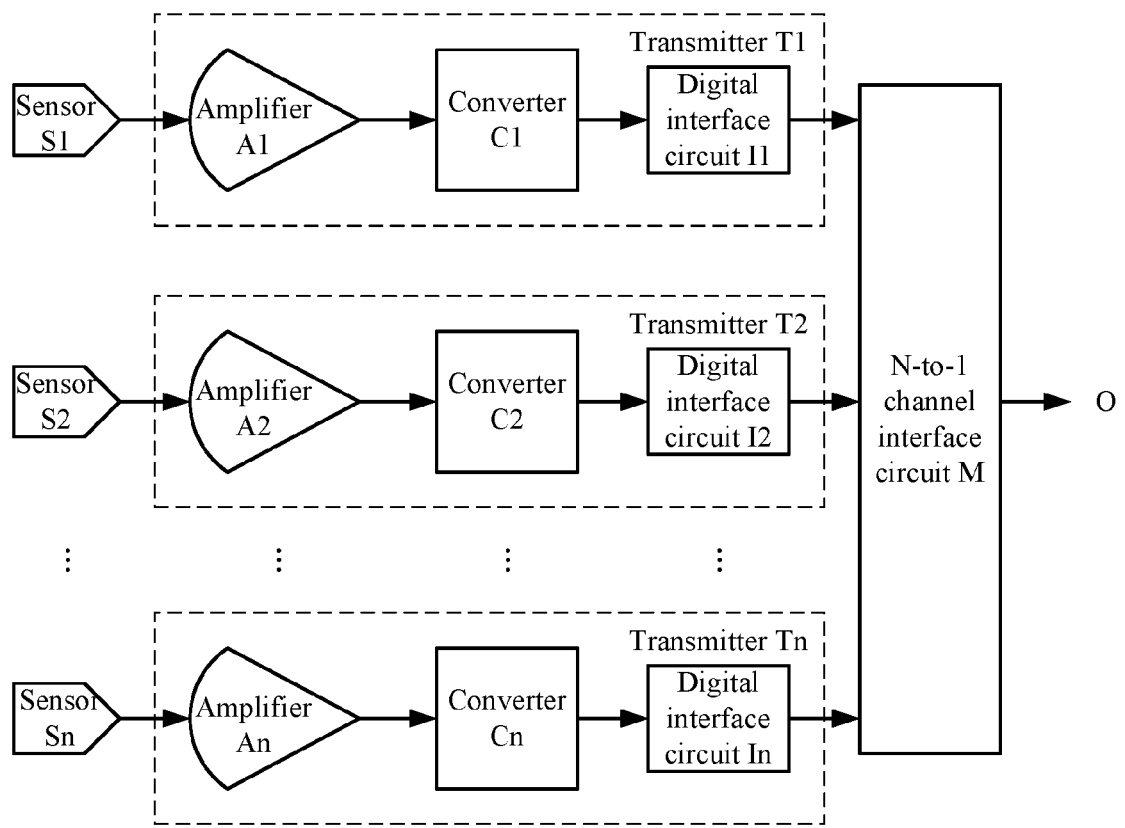
FIG. 1 is a schematic diagram illustrating a typical topology of sensors and transmitters in the prior art.
Figure 2:
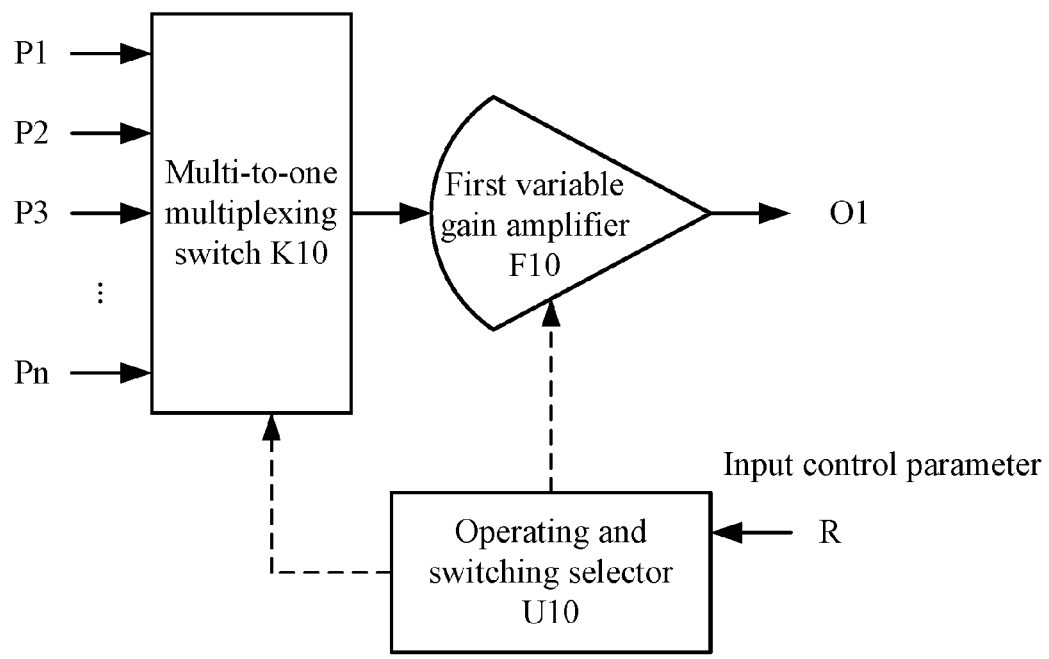
FIG. 2 is a schematic block diagram illustrating an embodiment of the transmitter according to the present disclosure.

FIG. 2 is a schematic block diagram illustrating an embodiment of the transmitter according to the present disclosure, and connection relationships among respective contained components are shown in FIG. 2. As shown in FIG. 2, the transmitter in the present disclosure includes: a multi-to-one multiplexing switch K10 configured to receive a plurality of sensor signals from a plurality of channels (not shown) through a plurality of input terminals P1, P2, P3, . . . and Pn, select one sensor signal from the plurality of sensor signals, and output the selected sensor signal through one output terminal; a first variable gain amplifier F10 configured to receive the selected sensor signal, amplify the selected sensor signal with a gain within a first gain range, and output the amplified sensor signal through an output terminal O1; a control parameter input terminal R configured to receive an input control parameter from the outside of the transmitter; and an operating and switching selector U10 configured to perform operations according to the input control parameter, so as to control the multi-to-one multiplexing switch K10 to select the one sensor signal and control the gains of the first variable gain amplifier F10. The input control parameter from the outside of the transmitter may be from a user, or may be from a computer, another transmitter, or similar devices for control. The operating and switching selector U10 may perform operations according to a predefined arithmetic, based on the input control parameter inputted from a user in advance, and control the multi-to-one multiplexing switch K10, the first variable gain amplifier F10 and other units to be controlled which will be described below according to results of the operations, so as to provide perfect usability for users. In addition, the operating and switching selector U10 may also directly control the multi-to-one multiplexing switch K10, the first variable gain amplifier F10 and other units to be controlled which will be described below according to the input control parameter input by the user temporarily, so as to provide perfect intervention of users.

The transmitter of the present disclosure shown in FIG. 2 may receive a plurality kinds of sensor signals of a plurality of channels through the multi-to-one multiplexing switch K10, and dynamically select the sensor signal of any input channel under the control of the operating and switching selector U10, wherein processing manners to sensor signals of respective channels are configured by the operating and switching selector U10 independently, for example, different gains are set for the first variable gain amplifier F10 respectively according to features of the sensor signals of respective channels.

The operating and switching selector U10 may adopt hardware, such as a singlechip or an embedded processor, etc., and embedded software to achieve smart control functions of the transmitter. For example, the operating and switching selector U10 may control the switchover of the multi-to-one multiplexing switch K10 in a manner of polling, to realize that the sensor signals of the plurality of channels share the first variable gain amplifier F10. For example, the gain of the first variable gain amplifier F10 may be dynamically varied with respect to different sensor signals, according to programs and configuration files in the operating and switching selector U10. For example, the transmitter of the present disclosure may perform designated configurations and programming on processing rules of the sensor signals input through the input terminals P1, P2, P3, . . . and Pn.

Further, the operating and switching selector U10 may also adopt embedded software to achieve a sleep function of the transmitter or a sensor (not shown), i.e., making the transmitter and the sensor to be sleep during a non-sampling period, and awaking them to sample signals during a predefined sampling period.

Compared with the transmitters in the related art, the transmitter of the present disclosure reduces the number of hardware components greatly, thus may be achieved by adopting a highly integrated small-size signal plate, even a chip, without specific requirement for power supply.

When adapting to a newly-added kind of sensor, the transmitter of the present disclosure only needs to update the embedded software or data in the operating and switching selector U10. Thereby, the transmitter of the present disclosure may take the place of the majority of transmitters in case that no high-speed and continuous sampling is needed.

Figure 3:
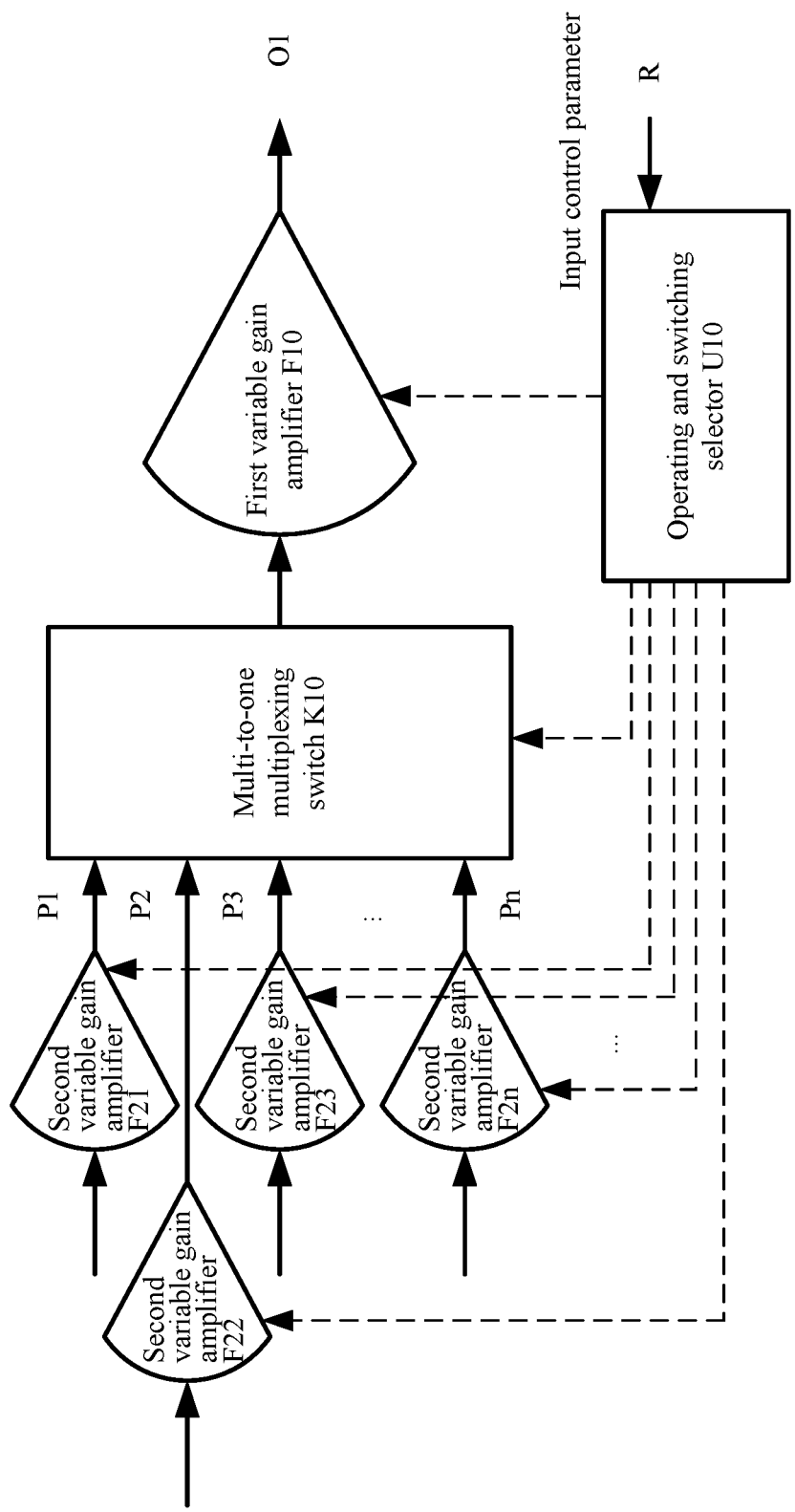
FIG. 3 is a schematic block diagram illustrating another embodiment of the transmitter according to the present disclosure.

FIG. 3 is a schematic block diagram illustrating another embodiment of the transmitter according to the present disclosure. Since the technical solution shown in FIG. 3 of the present disclosure is a variation based on the technical solution shown in FIG. 2, the depictions to the same part are omitted, which is applicable to the other embodiments below.

As shown in FIG. 3, the transmitter according to another embodiment of the present disclosure may further include a plurality of second variable gain amplifiers F21, F22, F23, ... and F2n configured to be placed at a preceding stage of the multi-to-one multiplexing switch K10 for respectively receiving the plurality of sensor signals, be controlled by the operating and switching selector U10 to pre-amplify the plurality of sensor signals with gains within a second gain range, and output the plurality of pre-amplified sensor signals to the plurality of input terminals P1, P2, P3, ... and Pn of the multi-to-one multiplexing switch K10.

In the transmitter of the present disclosure shown in FIG. 3, the processing manners to sensor signals of respective channels may be configured by the operating and switching selector U10 independently. For example, in addition to setting the gain of the first variable gain amplifier F10, different gains may also be set to the second variable gain amplifiers F21, F22, F23, ... and F2n respectively according to features of the sensor signals of respective channels, such that the transmitter of the present disclosure has a stronger adapting capability to different kinds of sensors, and has a more stable amplifying capability to the sensor signals.

Figure 4:
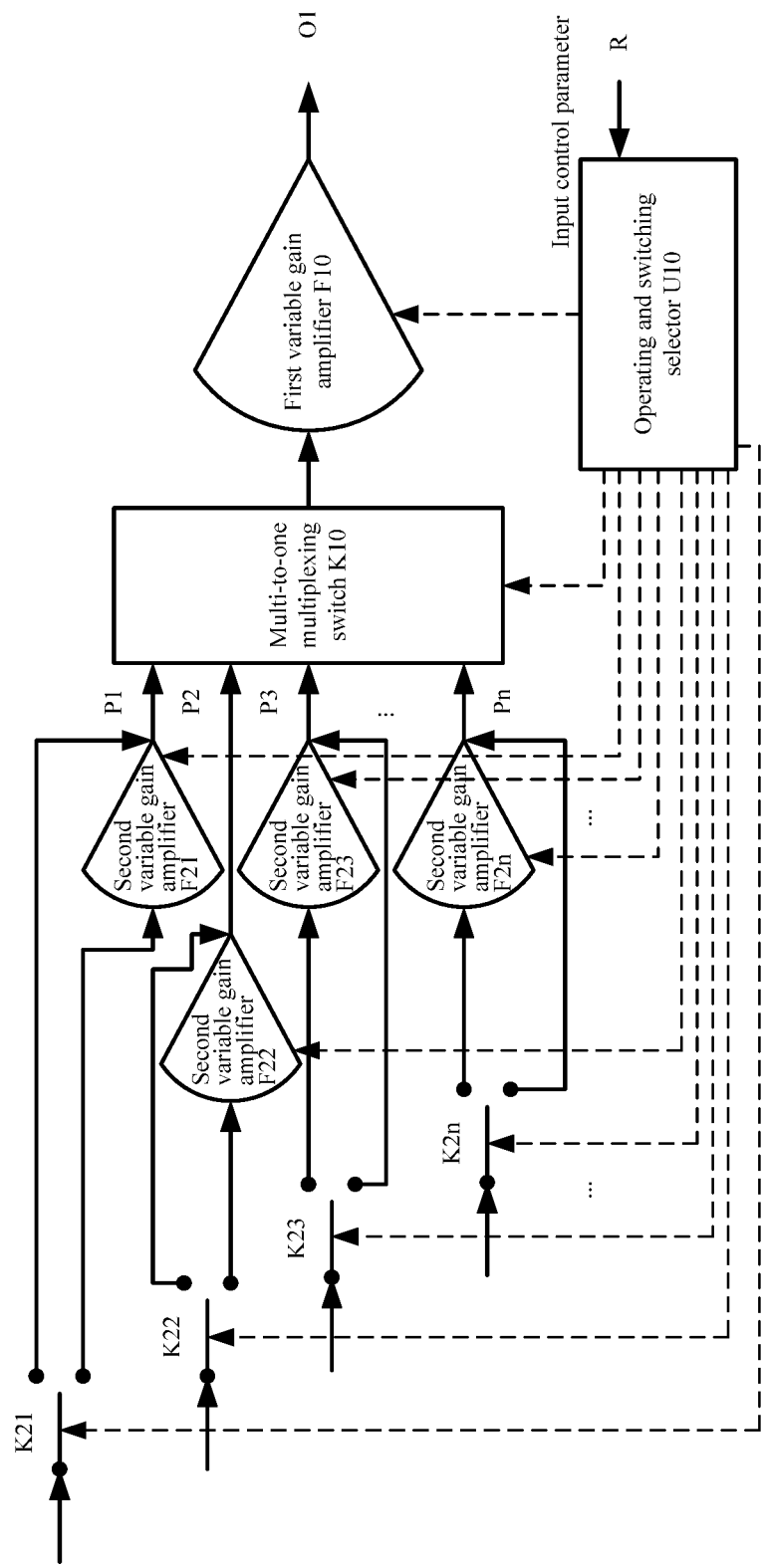
FIG. 4 is a schematic block diagram illustrating further another embodiment of the transmitter according to the present disclosure.

FIG. 4 is a schematic block diagram illustrating further another embodiment of the transmitter according to the present disclosure. As shown in FIG. 4, the transmitter of the further another embodiment of the present disclosure further includes a plurality of analog switches K21, K22, K23, ... and K2n configured to be placed at a preceding stage of the plurality of corresponding second variable gain amplifiers F21, F22, F23, ... and F2n for respectively receiving the plurality of sensor signals, and be controlled by the operating and switching selector U10 to directly transfer the plurality of sensor signals to the plurality of input terminals P1, P2, P3, ... and Pn of the multi-to-one multiplexing switch K10, or to the plurality of second variable gain amplifiers F21, F22, F23, ... and F2n.

In the transmitter of the present disclosure shown in FIG. 4, the processing manners to sensor signals of respective channels may be configured by the operating and switching selector U10 independently. For example, the sensor signals of respective channels may be directly transferred to the plurality of corresponding input terminals P1, P2, P3, ... and Pn of the multi-to-one multiplexing switch K10, or transferred to the corresponding plurality of second variable gain amplifiers F21, F22, F23, ... and F2n, according to features of the sensor signals of respective channels, such that the transmitter of the present disclosure has a further stronger adapting capability to different kinds of sensors, and has a further more stable amplifying capability to the sensor signals.

Figure 5:
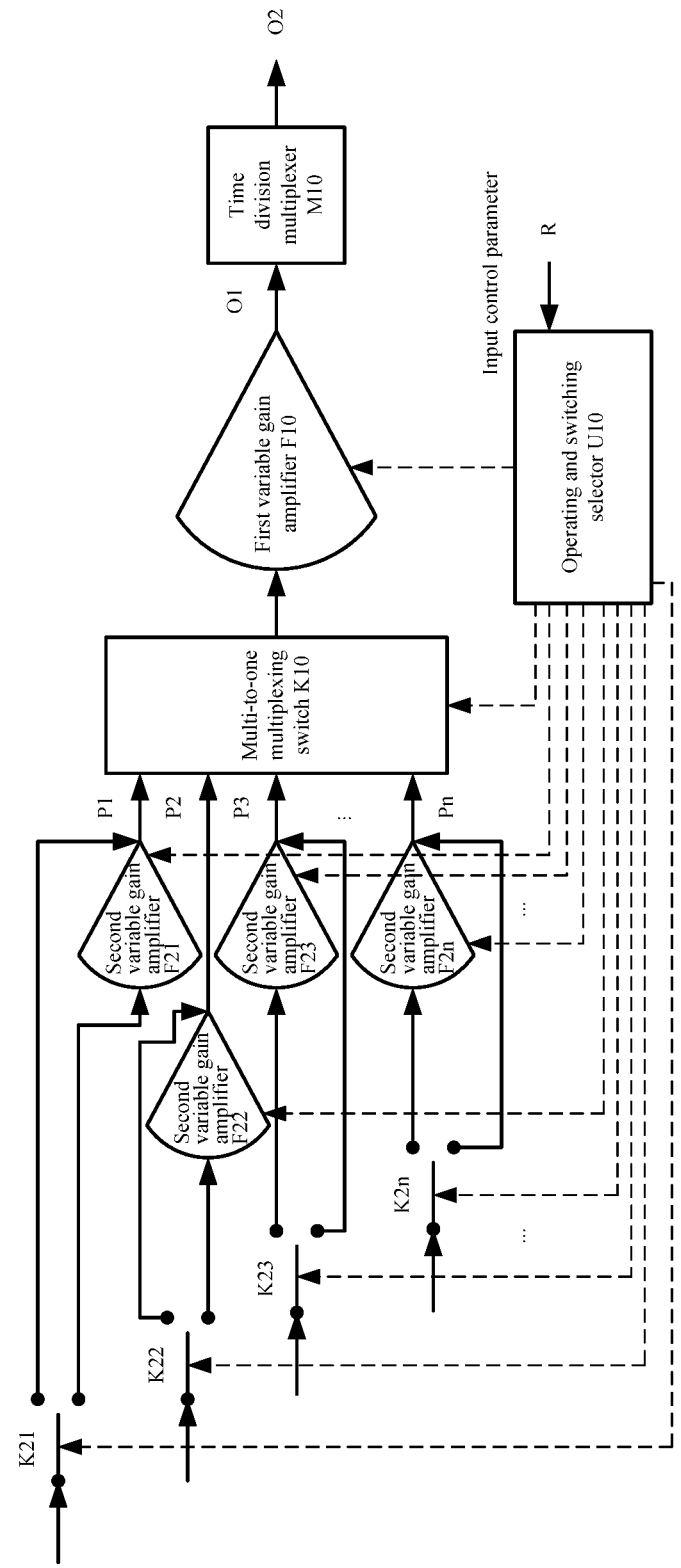
FIG. 5 is a schematic block diagram illustrating still another embodiment of the transmitter according to the present disclosure.

FIG. 5 is a schematic block diagram illustrating still another embodiment of the transmitter according to the present disclosure. As shown in FIG. 5, the transmitter of the still another embodiment of the present disclosure further includes a time division multiplexer M10 configured to be placed at a subsequent stage of the first variable gain amplifier F10, i.e., after the output terminal O1, so as to perform time division multiplexing to the amplified sensor signals output from the output terminal O1 of the first variable gain amplifier F10, and output the time division multiplexed sensor signals through the output terminal O2.

In the transmitter of the present disclosure shown in FIG. 5, the amplified sensor signals of respective channels may be time division multiplexed, and the time division multiplexed sensor signals may be output, so as to save transferring lines in the subsequent stages.

Figure 6:
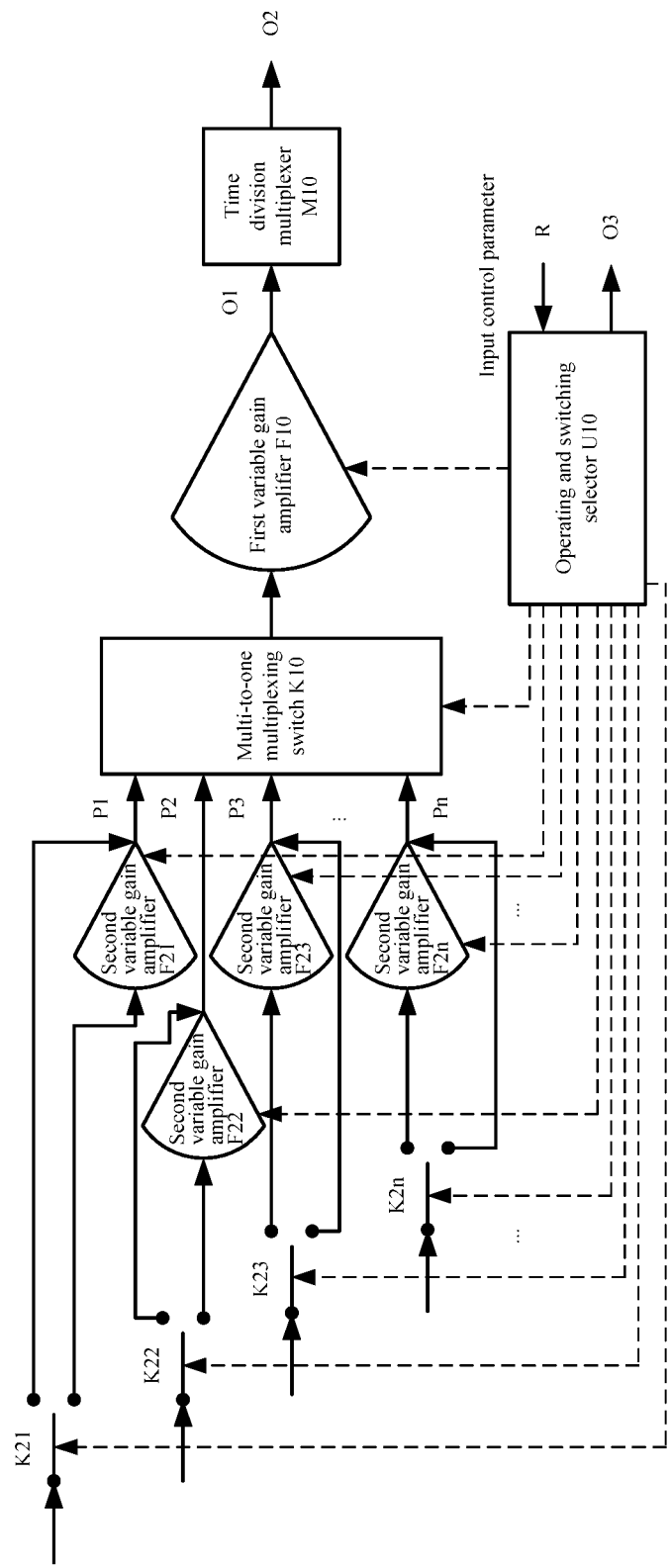
FIG. 6 is a schematic block diagram illustrating still further another embodiment of the transmitter according to the present disclosure.

FIG. 6 is a schematic block diagram illustrating still further another embodiment of the transmitter according to the present disclosure. As shown in FIG. 6, the transmitter of the still further another embodiment of the present disclosure further includes a control parameter output terminal O3 configured to output an output control parameter generated by the operating and switching selector U10. The output control parameter includes at least one of channel numbers corresponding to sources of the plurality of the sensor signals, control parameters for cascading expansion of the transmitter, and control parameters for directly controlling devices outside the transmitter. For example, for some specific sensors needing specific temperature compensation, an independent temperature compensation module may be added additionally, which is controlled by the operating and switching selector U10 based on the output control parameter.

In the transmitter of the present disclosure shown in FIG. 6, the input channels of the sensor signals may be switched according to the channel numbers corresponding to sources of the plurality of the sensor signals output by the transmitter, so as to select and process signals of designated channels; the cascading expansion of the transmitter may also be achieved according to the control parameters for cascading expansion of the transmitter, which greatly increases the availability of the transmitter; and the operations of outside devices such as a power device, a heat exchanging device, a lighting device, a feeding device and various compensation modules, etc., may be also directly controlled in real time according to the control parameters for directly controlling devices outside the transmitter, so as to facilitate adjusting environmental statuses or obtaining a more accurate measurement result.

Figure 7:
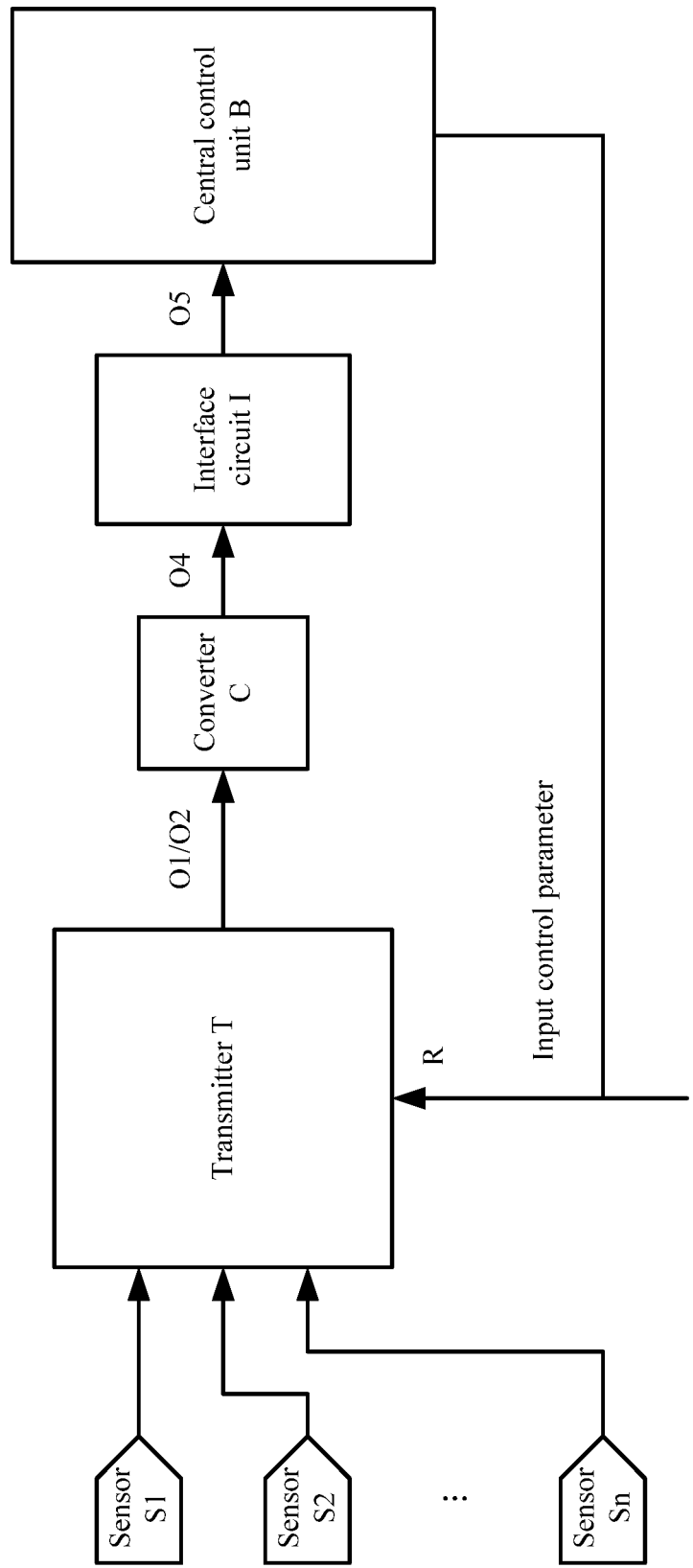
FIG. 7 is a schematic block diagram illustrating an embodiment of the monitoring system according to the present disclosure.

Corresponding to the transmitter of the present disclosure, as another aspect of the present disclosure, the present disclosure further provides a monitoring system using this transmitter. FIG. 7 is a schematic block diagram illustrating an embodiment of the monitoring system according to the present disclosure.

As shown in FIG. 7, the monitoring system according to the present disclosure includes: a plurality of sensors S1, S2, ... and Sn configured to generate a plurality of sensor signals of a plurality of channels; a transmitter T which is the above-described transmitter of the present disclosure; an analog/digital converter C configured to receive the amplified sensor signals output from the output terminal O1 or O2 of the transmitter T, convert the amplified sensor signals into digital sensor signals, and output the converted digital sensor signals through an output terminal O4; an interface circuit I configured to receive the digital sensor signals, encode and capsulate the digital sensor signals into a digital output, and output the digital output through an output terminal O5; and a central control unit B configured to send the input control parameters to the transmitter T, receive the digital outputs output from the output terminal O5, and decapsulate and decode the digital output, so as to reproduce and display the plurality of sensor signals. Herein, the input control parameters from the outside of the transmitter is not limited to be from the central control unit B, which may also be from the user, or from another computer, another transmitter, or similar devices for control.

The monitoring system of the present disclosure shown in FIG. 7 adopts the above-mentioned transmitter, thereby inherits the advantages brought out by the above-mentioned transmitter.

Figure 8:
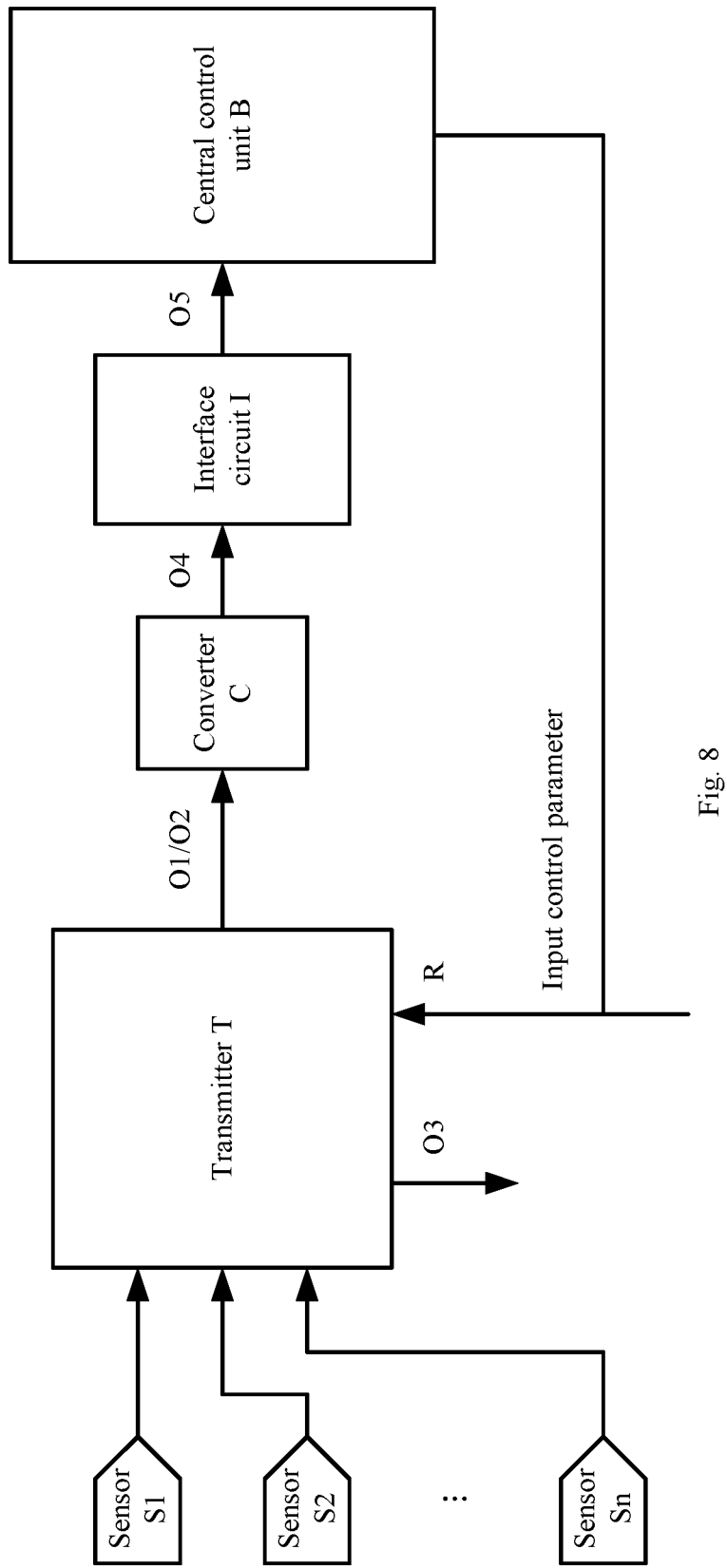
FIG. 8 is a schematic block diagram illustrating another embodiment of the monitoring system according to the present disclosure.

FIG. 8 is a schematic block diagram illustrating another embodiment of the monitoring system according to the present disclosure. As shown in FIG. 8, in the monitoring system of the present disclosure, the transmitter T further includes a control parameter output terminal O3 configured to output an output control parameter generated by the above operating and switching selector U10. The output control parameter includes at least one of channel numbers corresponding to sources of the plurality of the sensor signals, control parameters for cascading expansion of the transmitter, and control parameters for directly controlling devices outside the transmitter. For example, for some specific sensor needing specific temperature compensation, an independent temperature compensation module may be added additionally, which is controlled by the operating and switching selector U10 based on the output control parameters.

Figure 9:
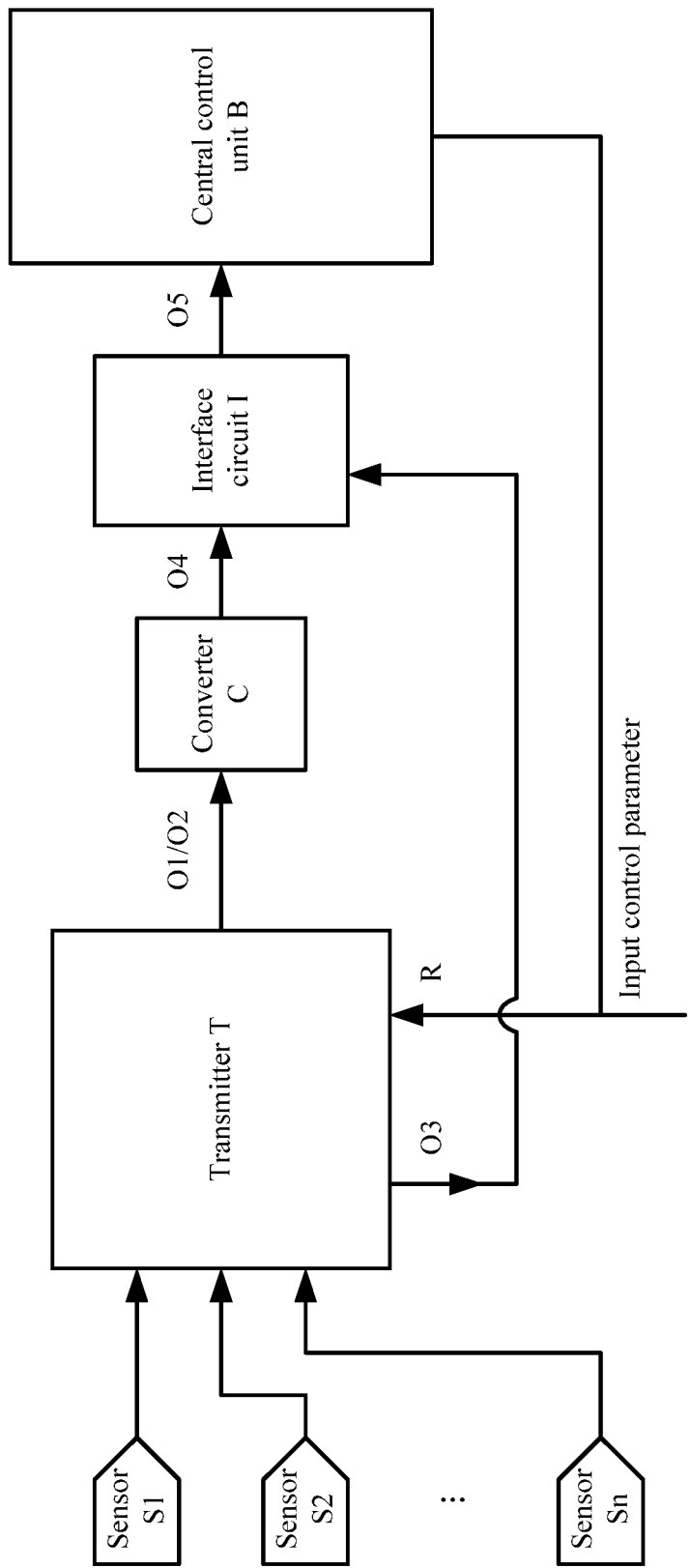
FIG. 9 is a schematic block diagram illustrating further another embodiment of the monitoring system according to the present disclosure.

FIG. 9 is a schematic block diagram illustrating further another embodiment of the monitoring system according to the present disclosure. As shown in FIG. 9, in the monitoring system of the present disclosure, the interface circuit I is configured to receive the channel numbers output from the control parameter output terminal O3 of the transmitter T, encode and capsulate the channel numbers and the corresponding digital sensor signals into the digital output, and output the digital output through the output terminal O5. In this case, the digital output includes the channel numbers such that sensor signals of different channels may be selected according to the channel numbers.

Figure 10:
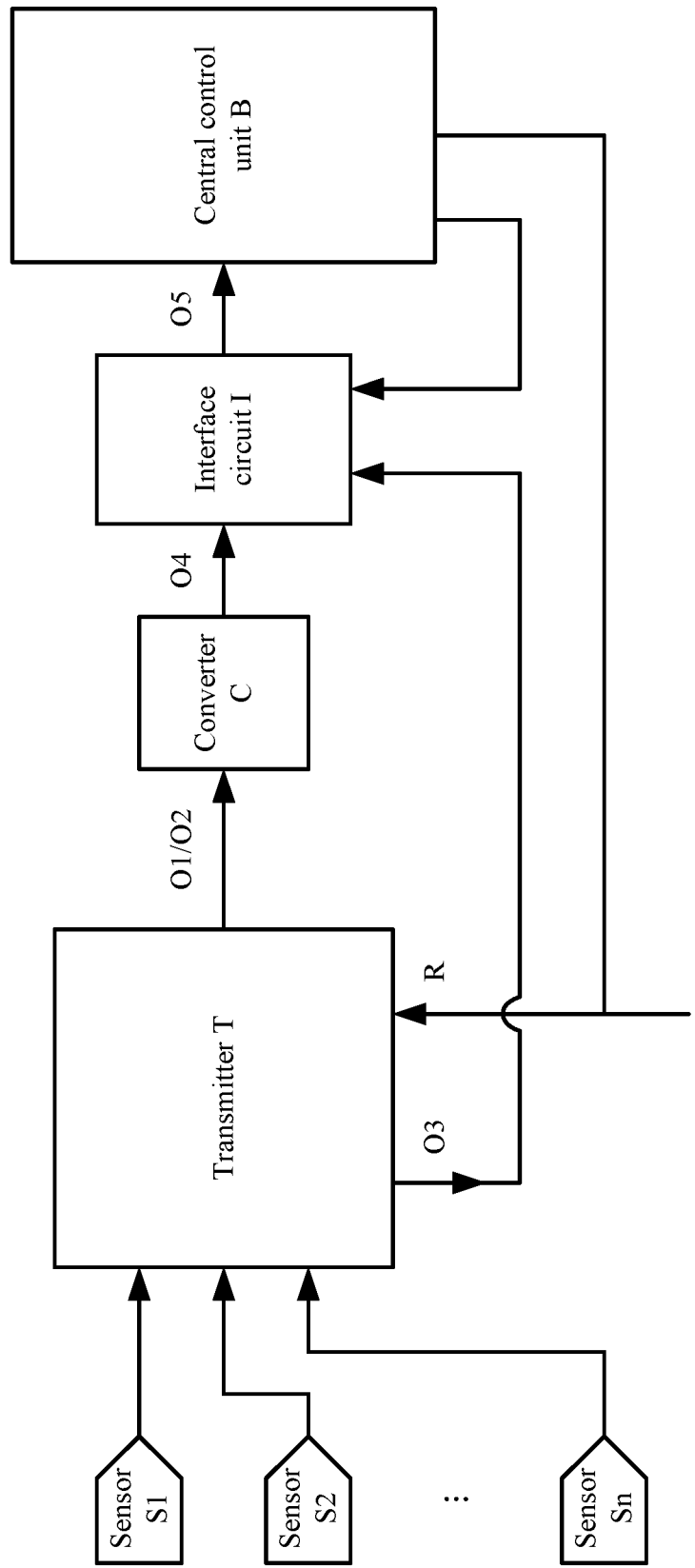
FIG. 10 is a schematic block diagram illustrating still another embodiment of the monitoring system according to the present disclosure.

FIG. 10 is a schematic block diagram illustrating still another embodiment of the monitoring system according to the present disclosure. As shown in FIG. 10, in the monitoring system of the present disclosure, the central control unit B is configured, by designating a channel number to the interface circuit I, to obtain a digital output of the sensor signal corresponding to the designated channel number from the interface circuit I.

Figure 11:
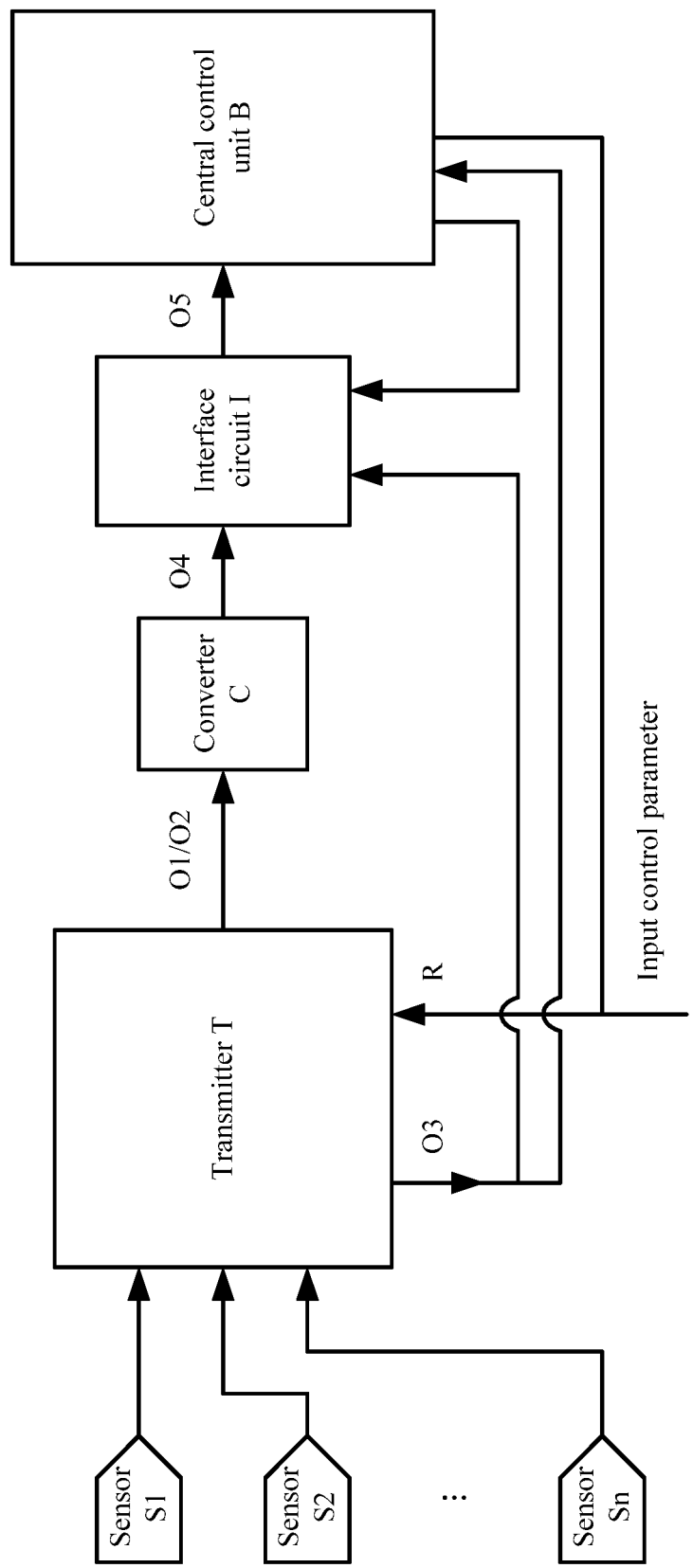
FIG. 11 is a schematic block diagram illustrating still further another embodiment of the monitoring system according to the present disclosure.

FIG. 11 is a schematic block diagram illustrating still further another embodiment of the monitoring system according to the present disclosure. As shown in FIG. 11, in the monitoring system of the present disclosure, the central control unit B is configured to receive the output control parameters output from the control parameter output terminal O3 of the transmitter T, and determine the state of the transmitter T according to the output control parameters, so as to facilitate monitoring and maintaining the transmitter or respective sensors.

Figure 12:
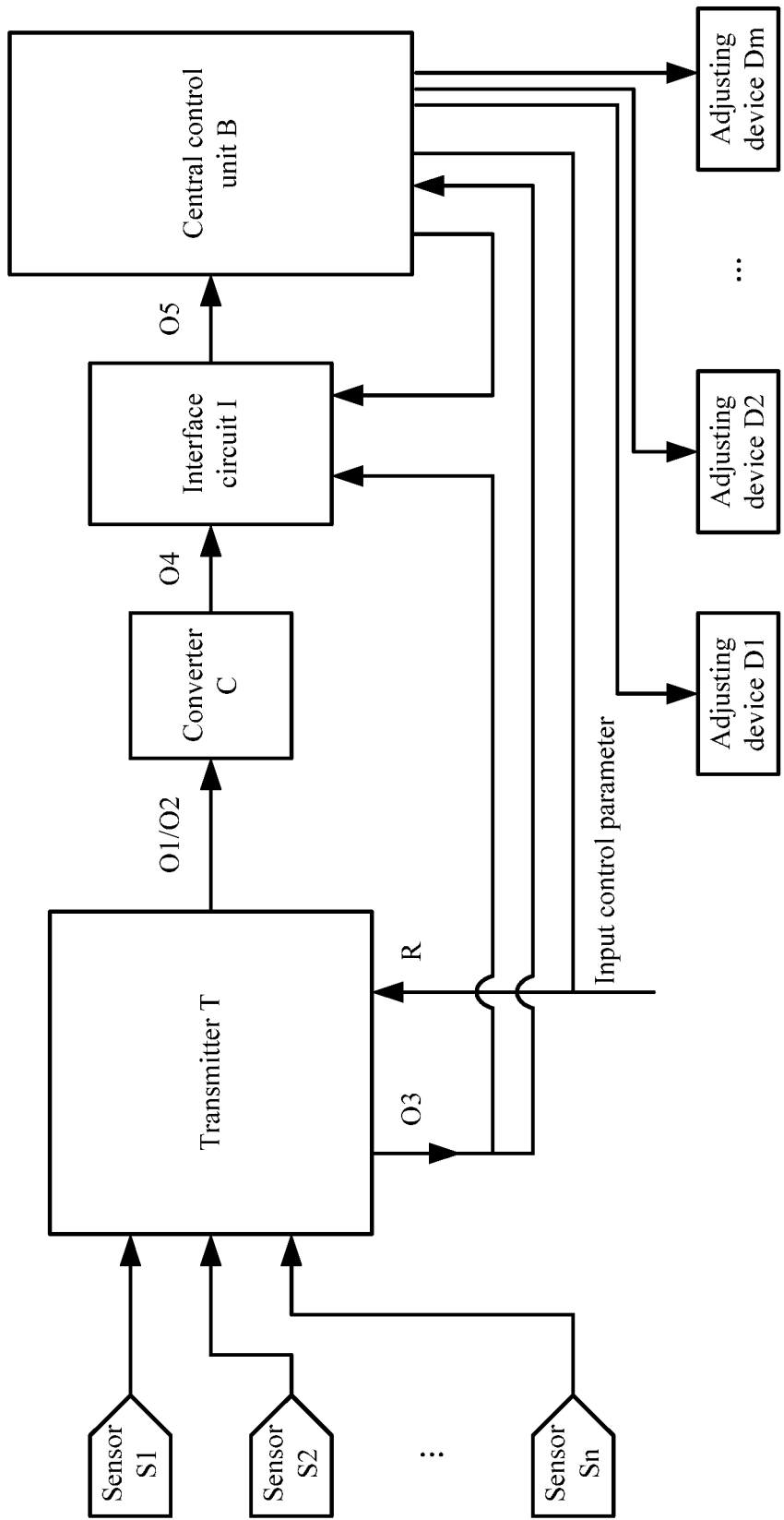
FIG. 12 is a schematic block diagram illustrating still further another embodiment of the monitoring system according to the present disclosure.

FIG. 12 is a schematic block diagram illustrating still further another embodiment of the monitoring system according to the present disclosure. As shown in FIG. 12, in the monitoring system of the present disclosure, the central control unit B is configured to generate a trigger signal (not shown) according to the plurality of reproduced sensor signals, and send the trigger signal to adjusting devices D1, D2, . . . and Dn which mates with the plurality of sensors, so as to drive the adjusting devices D1, D2, . . . and Dn. For example, the central control unit B may control operations of the adjusting devices outside the transmitter T, such as power devices, heat exchanging devices, lighting devices, feeding devices and various compensation modules, so as to facilitate adjusting environmental statuses or obtaining a more accurate measurement result.

Figure 13:
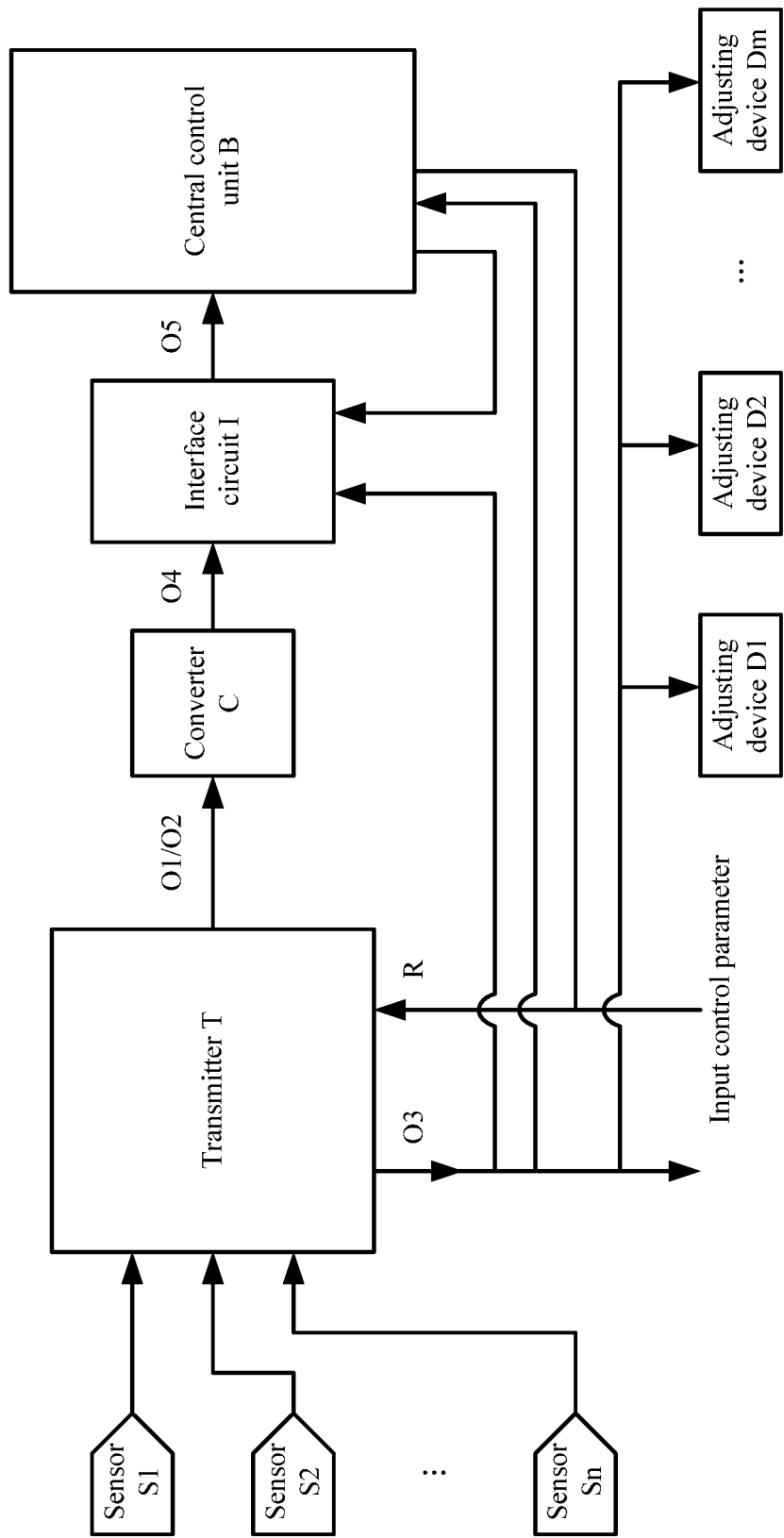
FIG. 13 is a schematic block diagram illustrating still further another embodiment of the monitoring system according to the present disclosure.

FIG. 13 is a schematic block diagram illustrating still further another embodiment of the monitoring system according to the present disclosure. As shown in FIG. 13, in the monitoring system of the present disclosure, the transmitter T directly sends the control parameters for directly controlling the devices D1, D2, . . . and Dn outside the transmitter T to the adjusting devices D1, D2, . . . and Dn which mates with the plurality of sensors, for directly driving the adjusting devices, so as to directly control operations of the devices D1, D2, . . . and Dn (such as power devices, heat exchanging devices, lighting devices, feeding devices and various compensation modules) outside the transmitter T in real time, thereby to facilitate adjusting environmental statuses or obtaining a more accurate measurement result.

From above, the transmitter and the monitoring system using the transmitter in the present disclosure may set types and required gains of accessed signals of respective channels according to signal features of various sensors, and may achieve functions of multiplexing, sleeping and waking up.

The transmitter and the monitoring system using the transmitter in the present disclosure may receive various types of sensor input signals, and may select channels arbitrarily and dynamically. The signal of each channel may have independent configuration, i.e., whether to use a primary amplifier, and how to determine a primary amplification factor and a secondary amplification factor.

The transmitter and the monitoring system using the transmitter in the present disclosure control the amplification and modulation of the sensor signals by using hardware such as a singlechip or a processor, and embedded software. The amplification factors of the two stages for the input signal are varied according to the programs and configuration files, and a dynamical variation may be achieved.

The transmitter and the monitoring system using the transmitter in the present disclosure control the switching of the multi-channel switch by using the embedded software, so as to achieve the polling function that a plurality of signals share the two stages of amplifiers.

The transmitter and the monitoring system using the transmitter in the present disclosure achieve sleeping function by using the embedded software, so as to make the system enter sleep mode during a non-sampling period, and awake the system to sample signals during a predefined sampling period.

The transmitter and the monitoring system using the transmitter in the present disclosure adopt a digital-analog mixing circuit, are integrated with the operating and switching selector, and may be highly integrated into a small-size singlechip, even a wafer, without a specific power supply requirement.

The transmitter and the monitoring system using the transmitter in the present disclosure may pre-amplify the sensor signals, may configure and program respective ports of the transmitter and rules, may receive outside synchronizing signals to switch channels and output current channel numbers for outside processing, may substitute a majority of transmitters where no high-speed continuous sampling is needed, and may substitute a plurality types of sensor transmitters simultaneously by only updating the embedded software.

The transmitter and the monitoring system using the transmitter in the present disclosure have digital control parameter outputs, can be extended, and can support more extended characters. For example, for some specific sensors needing specific temperature compensation, a multi-channel independent temperature compensation module may be added additionally, which is controlled by the operating and switching selector. For another example, the transmitter may achieve a cascading control by joining on an external circuit, which greatly increases the availability. In addition, for instance, a PLC may be used to connect the operating and switching selector for control.

By using the transmitter and the monitoring system using the transmitter in the present disclosure, a single transmitter may support more than ten channels of sensor signals, or even more than a hundred channels of sensor signals, and may be designed to be cascaded and extendable, which may greatly reduce the cost of purchase and usage.

The transmitter and the monitoring system using the transmitter in the present disclosure may be applied in more than 80% of non-real time high-speed sampling circumstances, and may reduce the cost of a single-channel transmitter from thousands of yuan to hundreds of yuan, tens of yuan or even lower, thereby to greatly reduce the cost and promote large scale applications of sensors.

The transmitter and the monitoring system using the transmitter in the present disclosure may reduce 50% or even more of the fee for deploying and installing on site.

By using the transmitter and the monitoring system using the transmitter in the present disclosure, the modularization and standardization efficiency of the production may be increased to a double or more.

The transmitter and the monitoring system using the transmitter in the present disclosure may reduce energy consumption. Taking one-channel sensor transmitter and the sampling frequency being once an hour as an example, there are totaling N channels. When using traditional circuits, a transmitter needs to be supplied with power continuously, on the assumption that the total power consumption of one-channel A/D converter and interface circuit is 100 units. After the transmitter of the present disclosure is used, the total power consumption of one-channel A/D and interface circuit may be reduced to close to 100/N. That is, the more the used channels are, the more obvious the energy saving is.

The transmitter and the monitoring system using the transmitter in the present disclosure do not need a hardware switch, have a long lifetime, a simple circuit and a high reliability, and are suitable for batch production.

Since adopting embedded software controls, the transmitter and the monitoring system using the transmitter in the present disclosure have an extraordinary flexibility and extendability, have various operation modes, and have independent configuration and characteristic for each channel for judgment and usage of the operating and switching selector, thus become a true versatile and highly centralized multiplexing transmitter. For example, for a water quality remote monitoring system, typically, many kinds of sensors and transmitters, as well as a plurality of channels of A/D and interface circuits are needed. For instance, with respect to potential of hydrogen PH value, dissolved oxygen, temperature, pressure, turbidity, etc., there are generally more than 10 channels of sensors and transmitters. However, if the transmitter and the monitoring system using the transmitter in the present disclosure are used, after the software is set, the plurality of sensors may share the one-channel transmitter, one-channel A/D converting and interface circuit.

By using the transmitter and the monitoring system using the transmitter in the present disclosure, the transmitter may be programmed, and signal smart matching, converting and transmission may be performed by using the operating and switching selector to control the amplification factors of the primary or secondary amplifiers via software, thereby the maximum signal to noise ratio and consistent output characteristic of the signal may be ensured, and universality may be achieved. A plurality of types of sensors may time division multiplex the two stages of amplifiers, the A/D converting and interface circuit through the multi-channel switch, and individually have independent amplifying factors and switching, without influencing each other.

Although the present disclosure has been described with reference to the typical embodiments, it should be noted that the terms used here are illustrative and exemplary, but not restrictive. Since the present disclosure may be embodied in many forms, it should be understood that the above embodiments are not limited to any preceding details, but shall be interpreted broadly within the scope defined in the accompanying claims. Therefore, all the variations and modifications falling within the claims or its equivalent scope shall be included in the accompanying claims.

What is claimed is:

1. A transmitter, comprising:
    a multi-to-one multiplexing switch configured to receive a plurality of sensor signals of a plurality of channels through a plurality of input terminals, select one sensor signal from the plurality of sensor signals, and output the selected sensor signal through a output terminal;
    a first variable gain amplifier configured to receive the selected sensor signal, amplify the selected sensor signal with a gain within a first gain range, and output the amplified sensor signal;
    a control parameter input terminal configured to receive an input control parameter from outside of the transmitter;
    an operating and switching selector configured to perform operations according to the input control parameter, so as to control the multi-to-one multiplexing switch to select the one sensor signal and control the gain of the first variable gain amplifier;
    a plurality of second variable gain amplifiers configured to be placed at a preceding stage of the multi-to-one multiplexing switch for respectively receiving the plurality of sensor signals, be controlled by the operating and switching selector to pre-amplify the plurality of sensor signals with gains within a second gain range, and output the plurality of pre-amplified sensor signals to the plurality of input terminals of the multi-to-one multiplexing switch; and
    a plurality of analog switches configured to be placed at a preceding stage of the plurality of second variable gain amplifiers for respectively receiving the plurality of sensor signals, and be controlled by the operating and switching selector to transfer the plurality of sensor signals to the plurality of input terminals of the multi-to-one multiplexing switch, or to the plurality of second variable gain amplifiers.

2. The transmitter according to claim 1, further comprising:
    a time division multiplexer configured to be placed at a subsequent stage of the first variable gain amplifier, so as to perform time division multiplexing to the amplified sensor signals output from the first variable gain amplifier, and output the time division multiplexed sensor signals.

3. The transmitter according to claim 1, further comprising:
    a control parameter output terminal configured to output an output control parameter generated by the operating and switching selector.

4. The transmitter according to claim 3, wherein
    the output control parameter comprises at least one of the follows: channel numbers corresponding to sources of the plurality of the sensor signals, control parameters for cascading expansion of the transmitter, and control parameters for directly controlling devices outside the transmitter.

5. A monitoring system, comprising:
a plurality of sensors configured to generate a plurality of sensor signals of a plurality of channels;
a transmitter configured to comprise:
- a multi-to-one multiplexing switch configured to receive the plurality of sensor signals of the plurality of channels through a plurality of input terminals, select one sensor signal from the plurality of sensor signals, and output the selected sensor signal through a output terminal;
- a first variable gain amplifier configured to receive the selected sensor signal, amplify the selected sensor signal with a gain within a first gain range, and output the amplified sensor signal;
- a control parameter input terminal configured to receive an input control parameter from outside of the transmitter;
- an operating and switching selector configured to perform operations according to the input control parameter, so as to control the multi-to-one multiplexing switch to select the one sensor signal and control the gain of the first variable gain amplifier;
- a plurality of second variable gain amplifiers configured to be placed at a preceding stage of the multi-to-one multiplexing switch for respectively receiving the plurality of sensor signals, be controlled by the operating and switching selector to pre-amplify the plurality of sensor signals with gains within a second gain range, and output the pre-amplified plurality of sensor signals to the plurality of input terminals of the multi-to-one multiplexing switch; and
- a plurality of analog switches configured to be placed at a preceding stage of the plurality of second variable gain amplifiers for respectively receiving the plurality of sensor signals, and be controlled by the operating and switching selector to transfer the plurality of sensor signals to the plurality of input terminals of the multi-to-one multiplexing switch, or to the plurality of second variable gain amplifiers;

an analog/digital converter configured to receive the amplified sensor signals output from the transmitter, and convert the amplified sensor signals into digital sensor signals;
an interface circuit configured to receive the digital sensor signals, and encode and capsulate the digital sensor signals into a digital output; and
a central control unit configured to send the input control parameter to the transmitter, receive the digital output, and decapsulate and decode the digital output, so as to reproduce and display the plurality of sensor signals.

6. The monitoring system according to claim 5, wherein the transmitter further comprises:
a time division multiplexer configured to be placed at a subsequent stage of the first variable gain amplifier, so as to perform time division multiplexing to the amplified sensor signals output from the first variable gain amplifier, and output the time division multiplexed sensor.

7. The monitoring system according claim 5, wherein the transmitter further comprises:
a control parameter output terminal configured to output an output control parameter generated by the operating and switching selector.

8. The monitoring system according to claim 7, wherein the output control parameter comprises at least one of the follows: channel numbers corresponding to sources of the plurality of the sensor signals, control parameters for cascading expansion of the transmitter, and control parameters for directly controlling devices outside the transmitter.

9. The monitoring system according to claim 8, wherein the interface circuit is configured to receive the channel numbers, and encode and capsulate the channel numbers and the corresponding digital sensor signals into the digital output.

10. The monitoring system according to claim 9, wherein the central control unit is configured, by designating a channel number to the interface circuit, to obtain the digital output of the sensor signal corresponding to the designated channel number from the interface circuit.

11. The monitoring system according to claim 8, wherein the transmitter directly sends the control parameters for directly controlling the devices outside the transmitter to the adjusting devices which mates with the plurality of sensors, so as to directly drive the adjusting devices.

12. The monitoring system according to claim 7, wherein the central control unit is configured to receive the output control parameter, and determine a state of the transmitter according to the output control parameter.

13. The monitoring system according to claim 5, wherein the central control unit is configured to generate a trigger signal according to the plurality of reproduced sensor signals, and send the trigger signal to adjusting devices which mates with the plurality of sensors, so as to drive the adjusting devices.

\* \* \* \* \*